United States Patent
Boyapati et al.

(10) Patent No.: US 10,382,321 B1
(45) Date of Patent: Aug. 13, 2019

(54) AGGREGATE LINK BUNDLES IN LABEL SWITCHED PATHS

(71) Applicant: Juniper Networks, Inc., Sunnyvale, CA (US)

(72) Inventors: Suresh Kumar Boyapati, Sunnyvale, CA (US); Devendra Dilip Kulkarni, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 199 days.

(21) Appl. No.: 15/471,045

(22) Filed: Mar. 28, 2017

(51) Int. Cl.
H04L 12/703 (2013.01)
H04L 12/741 (2013.01)
H04L 12/723 (2013.01)
H04L 12/709 (2013.01)
H04L 12/751 (2013.01)

(52) U.S. Cl.
CPC .............. *H04L 45/28* (2013.01); *H04L 45/02* (2013.01); *H04L 45/245* (2013.01); *H04L 45/50* (2013.01); *H04L 45/745* (2013.01)

(58) Field of Classification Search
CPC ....... H04L 45/28; H04L 45/02; H04L 45/245; H04L 45/745; H04L 45/50; H04L 41/0654
See application file for complete search history.

(56) References Cited

U.S. PATENT DOCUMENTS

| | | | | |
|---|---|---|---|---|
| 8,937,865 B1* | 1/2015 | Kumar | ................... | H04L 47/125 370/235 |
| 8,942,256 B1* | 1/2015 | Barth | ...................... | H04L 45/02 370/469 |
| 9,253,097 B1* | 2/2016 | Barman | ................ | H04L 47/122 |
| 2015/0281045 A1* | 10/2015 | Torvi | ...................... | H04L 45/28 370/228 |

OTHER PUBLICATIONS

Zimmermann, "OSI Reference Model—The ISO Model of Architecture for Open Systems Interconnection," IEEE Transactions on Communications, vol. 28, No. 4, Apr. 1980, pp. 425-432.
Rosen et al., "Multiprotocol Label Switching Architecture," Network Working Group, IETF, RFC 3031, Jan. 2001, 61 pp.

(Continued)

*Primary Examiner* — Pao Sinkantarakorn
*Assistant Examiner* — Kabir U Jahangir
(74) *Attorney, Agent, or Firm* — Shumaker & Sieffert, P.A.

(57) ABSTRACT

The techniques described herein may reduce global repairs in Multiprotocol Label Switching (MPLS) Label-Switched Paths (LSPs) by using an aggregated link bundle as a primary path when multiple paths are available. As an example, a router may determine a respective interface type for each path of a plurality of paths; determine, based on the respective interface types, whether one or more paths from the plurality of paths satisfies a set of constraints that are configured such that an aggregated link bundle interface type is preferred over a single link interface type; determine a preferred path based on whether the set of constraints were (Continued)

satisfied; configure a routing table of the router with the preferred path as a LSP to the destination; and send, based on the routing table, one or more packets using an interface of the router associated with the LSP.

20 Claims, 4 Drawing Sheets

(56) References Cited

OTHER PUBLICATIONS

Katz et al., "Traffic Engineering (TE) Extensions to OSPF Version 2," Network Working Group, IETF, RFC 3630, Sep. 2003, 14 pp.
Berger et al., "The OSPF Opaque LSA Option," Network Working Group, IETF, RFC 5250, Jul. 2008, 17 pp.
Braden et al., "Resource ReSerVation Protocol (RSVP)—Verison 1 Functional Specification," Network Working Group, IETF, RFC 2205, Sep. 1997, 112 pp.
Awduche et al., "RSVP-TE: Extensions to RSVP for LSP Tunnels," Network Working Group, IETF, RFC 3209, Dec. 2001, 61 pp.
Thaler et al., "Multipath Issues in Unicast and Multicast Next-Hop Selection," Network Working Group, IETF, RFC 2991, Nov. 2000, 9 pp.
Hopps, "Analysis of an Equal-Cost Multi-Path Algorithm," Network Working Group, IETF, RFC 2992, Nov. 2000, 8 pp.
Manayya, "Constrained Shortest Path First," IETF, Network Working Group, Internet Draft, Feb. 20, 2009, 8 pp.
Sharma et al., "Framework for Multi-Protocol Label Switching (MPLS)-based Recovery," Network Working Group, IETF, RFC 3469, Feb. 2003, 40 pp.

\* cited by examiner

AGGREGATE LINK BUNDLES IN LABEL SWITCHED PATHS

TECHNICAL FIELD

The disclosure relates to packet-based computer networks and, more particularly, to forwarding packets within computer networks.

BACKGROUND

Routing devices within a network, often referred to as routers, maintain routing information that describe available routes through the network. Multi-protocol Label Switching (MPLS) is a mechanism used to engineer traffic patterns within Internet Protocol (IP) networks. By using MPLS, an ingress device, controller or other path computation element can orchestrate the establishment of a dedicated path through a network, i.e., a Label Switched Path (LSP). An LSP defines a distinct path through the network to carry MPLS packets from an ingress device to an egress device. The ingress device for a given LSP affixes a short label associated with that LSP to packets that travel through the network via the LSP. Routers along the path cooperatively perform MPLS operations to forward the MPLS packets along the established path. LSPs may be used for a variety of traffic engineering purposes including bandwidth management.

When a link in the path fails or experiences link flapping (e.g., repeatedly alternating from available to unavailable), an ingress router may implement global repair to protect against the link fault on the path. For example, global repair may provide end-to-end path recovery and/or restoration by calculating a new LSP. In particular, global repair may compute a primary path as a preferred LSP and a secondary path as an alternative LSP in case the primary path fails. For each link failure, global repair may implement Constrained Shortest Path First (CSPF) to configure the preferred LSP and alternative LSP. CSPF may be used to compute a shortest path based on Open Shortest Path First (OSPF) and Intermediate System to Intermediate System (IS-IS) routing protocols. However, implementing global repair for each instance of a link failure is time intensive and costly.

SUMMARY

In general, this disclosure describes techniques for reducing global repairs in MPLS LSPs by using an aggregated link bundle as a primary path. For example, when a router may forward packets to a destination using any one of a number of different paths, including a path that includes an aggregated link bundle and a different path that includes a single link, the router may select, according to an extended CSPF path computation operation, the aggregated link bundle as a preferred LSP. The CSPF may be extended to consider link interface types advertised by the routers in addition to considering the bandwidth requirements, hop limitations, administrative groups (e.g., colors), priority, explicit route, link attributes, and reservable bandwidth of the links. Based on the interface type advertised by the various routers along each path, the extended CSPF path computation operation may favor paths that include aggregated link bundles over paths that do not include such link bundles. By selecting paths that include aggregated link bundles as the preferred LSP, a link failure of one of the links in the aggregated link bundle typically will not trigger the global repair, therefore reducing the need to perform a reconstruction process of the particular LSP.

In one example, a method may include determining, by a router, a respective interface type for each path of a plurality of paths between the router and a destination, wherein each respective interface type is one of a single link or an aggregated link bundle. The method may also include determining, by the router and based on the respective interface types, whether one or more paths of the plurality of paths satisfies a set of constraints, wherein the set of constraints include at least the aggregated link bundle interface type configured to be more favorable than the single link interface type. The method may further include determining, by the router and based on whether one or more paths of the plurality of paths satisfies the set of constraints, a preferred path. The method may also include configuring, by the router, a routing table of the router with the preferred path as a Label-Switched Path (LSP) to the destination. The method may also include sending, by the router and based on the routing table, one or more packets using an interface of the router associated with the LSP.

In another example, a network device may include a plurality of network interfaces, each of the network interfaces coupled to a different one of a plurality of paths for reaching a destination network device. The network device may also include one or more hardware-based processors, implemented using discrete logic circuitry, configured to: determine a respective interface type for each path of a plurality of paths between the router and a destination, wherein each respective interface type is one of a single link or an aggregated link bundle; determine, based on the respective interface types, whether one or more paths of the plurality of paths satisfies a set of constraints, wherein the set of constraints include at least the aggregated link bundle interface type configured to be more favorable than the single link interface type; determine, based on whether one or more paths of the plurality of paths satisfies the set of constraints, a preferred path; configure a routing table of the router with the preferred path as a Label-Switched Path (LSP) to the destination; and send, based on the routing table, one or more packets using an interface of the router associated with the LSP.

In another example, a non-transitory computer-readable storage medium may include instructions that, when executed, cause one or more processors to: determine a respective interface type for each path of a plurality of paths between the router and a destination, wherein each respective interface type is one of a single link or an aggregated link bundle; determine, based on the respective interface types, whether one or more paths of the plurality of paths satisfies a set of constraints, wherein the set of constraints include at least the aggregated link bundle interface type configured to be more favorable than the single link interface type; determine, based on whether one or more paths of the plurality of paths satisfies the set of constraints, a preferred path; configure a routing table of the router with the preferred path as a Label-Switched Path (LSP) to the destination; and send, based on the routing table, one or more packets using an interface of the router associated with the LSP.

The details of one or more examples are set forth in the accompanying drawings and the description below. Other features, objects, and advantages will be apparent from the description and drawings, and from the claims.

DETAILED DESCRIPTION

Figure 1:
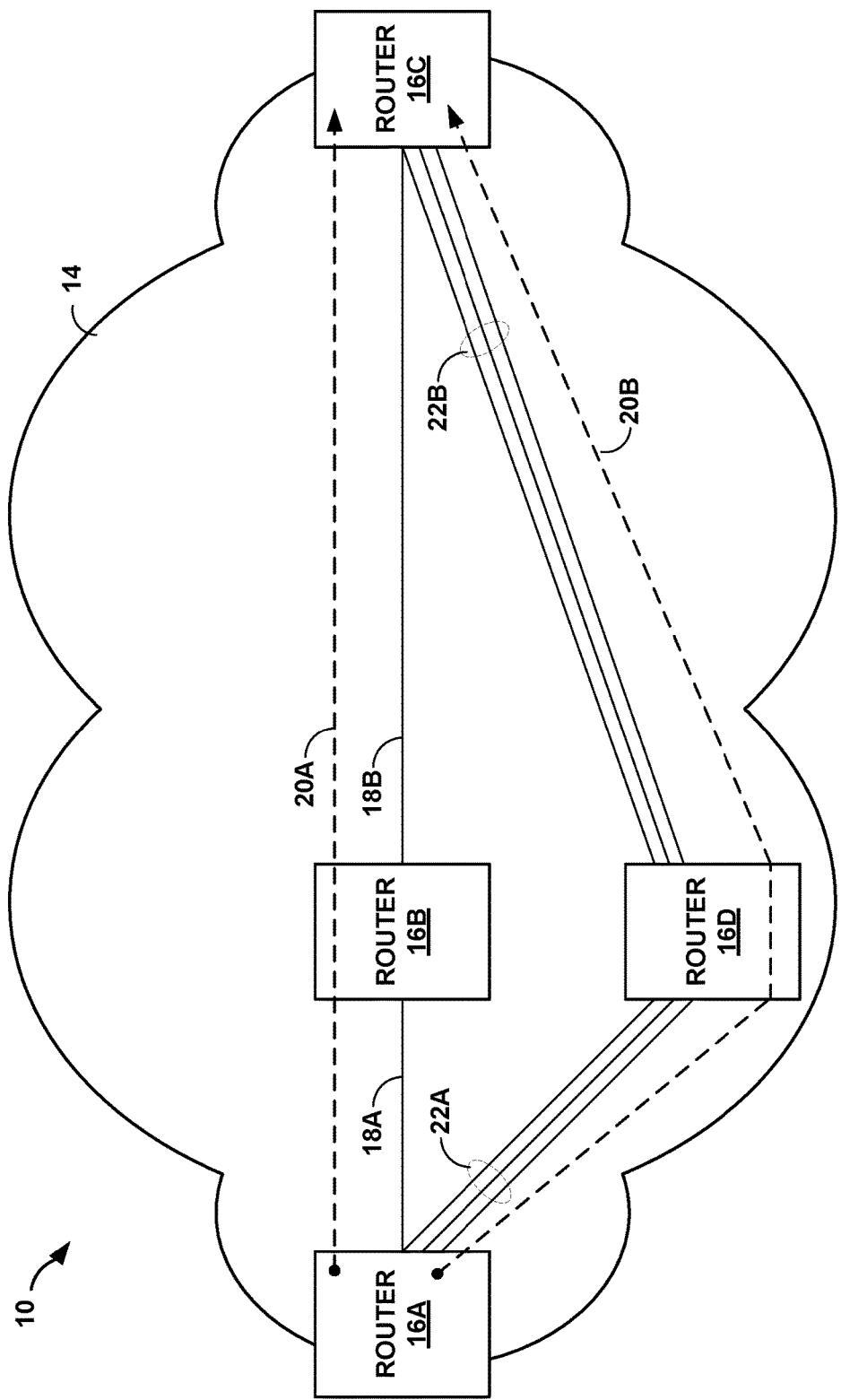
FIG. 1 is a block diagram illustrating an example system for reducing global repairs in MPLS LSPs by using an aggregated link bundle as a primary path, in accordance with the techniques described in this disclosure.

FIG. 1 is a block diagram illustrating an example system 10 in which a router coupled to various paths to reach a destination uses an aggregated link bundle as a preferred LSP, in accordance with the techniques described in this disclosure. In the example of FIG. 1, routers 16A-16D ("routers 16") support use of extended link-state interior routing messages to specify interface type information and apply an extended CSPF path computation operation to the interface type information to select an aggregated link bundle as a preferred LSP.

In the example of FIG. 1, network 14 may comprise a public network such as the Internet, a private network, such as those owned and operated by an enterprise or service provider, or a combination of both public and private networks. As a result, network 14 may be alternatively referred to herein as a Service Provider (SP) network. Network 14 may include one or more Wide Area Networks (WANs), Local Area Networks (LANs), Virtual Local Area Networks (VLANs), Virtual Private Networks (VPNs), and/or another type of network.

Network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

In some examples, network 14 may be a label switching network in which network devices such as routers 16, often referred to as Label Switching Routers or LSRs, use Multi-Protocol Label Switching (MPLS) signaling protocols to establish Label Switched Paths (LSPs) for transporting the network packets. The MPLS data-carrying mechanism of network 14 may be viewed as lying between layer 2 and layer 3 of the Open System Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, titled "Multiprotocol Label Switching Architecture," prepared by the Network Working Group of the Internet Engineering Task Force (IETF), dated January 2001, incorporated by reference herein.

Routers 16 each maintain routing information that describes available routes through network 14. Upon receiving an incoming packet, each of routers 16 examines information within the packet and forwards the packet in accordance with the routing information. In order to maintain an accurate representation of network 14, routers 16 exchange routing information (e.g., a list of one or more IP addresses corresponding to one or more interfaces of the router which originates the LSP) in accordance with a defined routing protocol, such as an Interior Gateway Protocol (IGP). For example, each of the routers may use a link-state routing protocol, such as Intermediate-System to Intermediate-System (IS-IS) protocol to advertise Link State Paths or Open Shortest Path First (OSPF) protocol to advertise Link State Advertisements (LSAs), to exchange link-state routing information to learn the topology of network 14. Further details regarding IS-IS and OSPF are found in Katz, D., "Traffic Engineering (TE) Extensions to OSPF Version 2," RFC 3830, September 2003, and Berger, L., "The OSPF Opaque LSA Option," RFC 5250, July 2008, each of which is incorporated herein by reference.

Routers 16 process the routing information to form a representation (e.g., in the form of a graph data structure) of network 14 and select paths based on the topology of network 14 to reach all available destinations. Routers 16 typically generate forwarding information by reducing the selected paths to so-called "next hops," which identify interfaces to which to forward traffic destined for a particular destination. In this way, the forwarding information specifies this list of next hops and associated interfaces, and maps destinations to respective interfaces. Each one of routers 16 installs the forwarding information in a forwarding plane of the router, whereupon the forwarding plane forwards received traffic in accordance with the forwarding information.

By using MPLS, an ingress device, such as router 16A, can request a path through a network, i.e., an LSP, such as LSPs 20A, 20B (collectively, "LSPs 20") in the example of FIG. 1. An LSP defines a distinct path through the network to carry MPLS packets from an ingress device, i.e., router 16A, to an egress device, i.e., router 16C. Routers along the LSP paths perform MPLS operations to forward the MPLS packets along the established LSP path. LSPs may generally be used for a variety of traffic engineering purposes including bandwidth management.

Router 16A may employ one of a variety of protocols to establish LSPs 20. For example, router 16A may use a label distribution protocol (LDP) to establish LSPs 20. Router 16A may, in some examples, use a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use information accumulated by a link-state interior routing protocol, such as the IS-IS protocol or the OSPF protocol.

In the example of FIG. 1, router 16A is assumed to have used RSVP-TE to establish a traffic engineered LSP, which is shown as one of LSPs 20. For example, router 16A uses RSVP-TE to establish LSP 20A that traverses router 16B with an egress of router 16C (which may also be referred to as "egress router 16C"). Similarly, router 16A uses RSVP-TE to establish LSP 20B that traverses router 16D with the egress of router 16C. Although not shown in the example of FIG. 1, additional intervening or transit routers may also be used in support of LSPs 20. Although not shown in FIG. 1, LSPs 20 may require additional routers to 16A-16D. Additional information regarding RSVP may be found in a request for comments (RFC) 2205, entitled "Resource ReSerVation Protocol (RSVP)-Version 1 Functional Specification," dated September 1997, the entire contents of which is hereby incorporated by reference in its entirety. More specific information regarding RSVP-TE explaining how RSVP may be extended for LSPs can be found in RFC 3209, entitled "RSVP-TE: Extensions to RSVP for LSP tunnels," dated December 2001, the entire contents of which is hereby incorporated by reference in its entirety.

Each of routers 16 may, as noted above, execute or otherwise operate in accordance with link-state interior routing protocols, such as the IS-IS routing protocol and the OSPF routing protocol. Routers 16 may use these protocols to calculate a shortest path to the destination device. To build the shortest path, routers 16 may use IS-IS and/or OSPF to flood link state information to learn the topology of network 14. For example, each of routers 16 may flood the network with the state of its links. Based on this information, the shortest path may use Dijkstra's Shortest Path First (SPF) algorithm to compute a shortest-path tree, for example.

In some examples, routers 16 may also advertise routing information including, bandwidth requirements, hop limitations, administrative groups (e.g., link colors), priority, explicit route, link attributes, and reservable bandwidth of links (e.g., static bandwidth minus the currently reserved bandwidth). When the above information is flooded, each of routers 16 conventionally store the information in a traffic engineering database (TED) such that routers may use the stored information to determine the shortest path based on constraints, commonly referred to as "Constrained Shortest Path First" (CSPF).

In general, CSPF may instruct a router to collect attribute information of the link to which each router is connected, flood the collected attribute information to other routers using IS-IS/OSPF extensions, combine each router according to the information to form a topology, and calculate constrained paths for the network. That is, a router may implement CSPF, which takes both the LSP attributes information in the TED and the constraints configured as an input, and constructs a shortest path route. After the router prunes paths that do not meet one or more of the above mentioned configured constraints, the router determines the best available path.

To select a path using CSPF, a router may initially compute LSPs one at a time, beginning with the highest priority LSP. Among LSPs of equal priority, CSPF typically services the LSPs in alphabetical order of the LSP names. The router prunes the traffic engineering database of all the links that are not full duplex and do not have sufficient reservable bandwidth. If the LSP configuration includes the include statement, the router prunes all links that do not share any included colors. If the LSP configuration includes the exclude statement, the router prunes all links that contain excluded colors.

If the router is configured to actively utilize various paths, i.e., links, when forwarding traffic to reach a destination network device, the router chooses the path whose last-hop address is the same as the LSP's destination. As one example, the router may be configured to generally apply an equal cost multi-path (ECMP) routing technique by which a router may forward packets destined for a particular destination device along any of a plurality of paths (links) of equal cost. A router implementing ECMP may identify, when forwarding a packet, which next-hop (path) of a plurality of next-hops to use. For example, the router may determine the next-hop using hash-threshold, Modulo-N, and/or Highest random weight (HRW) techniques. Further information regarding ECMP can be found in Request for Comments (RFC) 2991, titled "Multipath Issues in Unicast and Multicast Next-Hop Selection," prepared by the Network Working Group of the Internet Engineering Task Force (IETF), dated November 2000, and RFC 2992, titled "Analysis of an Equal-Cost Multi-Path Algorithm," IETF, dated November 2000, both incorporated by reference herein. Although some of the paths in FIG. 1 are illustrated with respect to ECMP paths, network system 10 may include other types of multi-path routing. Other examples may include weighted ECMP.

In instances where several paths remain with a last-hop address as the LSP destination, the router selects the one with the fewest number of hops. If several ECMP routes remain with the fewest number of hops, the router applies the CSPF load-balancing rule configured on the LSP. The CSPF load-balancing rule includes, for example, a random selection, a least-fill, and a most-fill selection policy. The random selection policy may select one of the remaining paths (e.g., one of the aggregated link bundles) at random. The least-fill selection policy may select the path with the largest minimum available bandwidth ratio. The most-fill selection policy may select the path with the smallest minimum available bandwidth ratio. Additional information regarding CSPF may be found in Manayya, KB, "Constrained Shortest Path First," draft-manayya-constrained-shortest-path-first-00.txt, IETF Internet Draft, dated Feb. 20, 2009, the entire contents of which is hereby incorporated by reference in its entirety.

In some instances, a single link may be configured as the primary path for various paths that are coupled to the router. When the single link fails, the router performs local repair, proceeded by global repair by the ingress router in which an end-to-end path recovery is applied. That is, when a single link fails, a reconstruction of the LSP is needed to reroute network traffic so as to circumvent the failed link.

For example, LSP 20A may include single links 18A, 18B (collectively, "single links 18") to routers 16B, 16C, respectively. Upon failure of link 18A, router 16A may implement local repair and configure a path around single link 18A to reach router 16C. Router 16A may then implement global repair e.g., CSPF computation, and notify other routers on the working path with a Fault Indication Signal (FIS), to trigger the reconstruction of the LSP based on constraints, for example. That is, link failure in MPLS LSPs that use a single link as a preferred LSP results more often in global repair, which further results in expensive and time intensive path computation (e.g., CSPF) that may be avoided if an aggregated link bundle was instead configured as the preferred LSP. More specific information regarding MPLS local repair and global repair can be found in RFC 3469, entitled "Framework for Multi-Protocol Label Switching (MPLS)-based Recovery," dated February 2003, the entire contents of which is hereby incorporated by reference in its entirety.

In accordance with the techniques of this disclosure, when router 16A is configured to actively utilize various links, including an aggregated link bundle and a single link, router 16A may be configured to select the aggregated link bundle as a preferred LSP to a destination device (e.g., router 16C), which may reduce the frequency at which router 16A performs global repair. In particular, the techniques of this disclosure describe extending a CSPF path computation operation to evaluate interface type information advertised by an extended link-state routing protocol such that the aggregated link bundle is more likely to be selected as the preferred LSP.

For example, in addition to advertising the LSP attributes described above, routers 16 may each advertise one or more interface types actively used by the router. In the example of FIG. 1, LSP 20A may include single links 18, each a 10 gigabit (gb) Ethernet link, used to communicate between router 16A to router 16C. LSP 20B may include aggregated link bundles 22A, 22B (collectively, "aggregated link bundles 22"). Each of the aggregated link bundles may aggregate links to form a virtual link or link aggregation group (LAG). For example, aggregated link bundles 22 may each comprise ten 1 gb Ethernet links, with a total of 10 gb link bandwidth used to communicate between router 16A to router 16D. A router may treat the aggregated link bundle as a single link to increase bandwidth, provide degradation as failure occurs, and increase availability. Each of routers 16 may use extended IS-IS or OSPF protocols to advertise the router's link interface type for consideration in a CSPF path computation.

For example, router 16A may advertise the link interface types of aggregated link bundle 22A and single link 18A using a Link State Packet (LSP) and/or link state advertisement (LSA), in accordance with IS-IS or OSPF protocols, respectively. As further described in FIG. 3, an extended IS-IS or OSPF packet may include at least a link interface type classifying link 22A as an aggregated link and link 18A as a single link. Further details regarding IS-IS and OSPF are found in Katz, D., "Traffic Engineering (TE) Extensions to OSPF Version 2," RFC 3630, September 2003, and in Berger, L., "The OSPF Opaque LSA Option," RFC 5250, July 2008, each of which is incorporated by reference herein.

Upon exchanging link interface type information from other routers, router 16A may update the TED to include the link interface type information. Router 16A may compute an LSP by implementing an extended CSPF path computation operation based on the link interface type information stored in the TED.

For example, when implementing the CSPF path computation operation, router 16A may determine that several paths remain with a last-hop address as the LSP destination. As described above, router 16A may be configured to actively utilize aggregate link bundle 22A and single link 18A when forwarding traffic to reach a destination network device. In this example, the extended CSPF may instruct router 16A to determine whether one of the multiple paths satisfies a set of constraints that include the aggregated link bundle interface type. In this example, the set of constraints may configure aggregated link bundle 22A to be more favorable than single link 18A. For example, router 16A may perform a constraint matching condition such that if aggregated link bundle 22A is present in the TED, router 16A may select aggregated link bundle 22A instead of single link 18A to be configured as a preferred LSP. In this way, when a router is configured to actively utilize multiple network links including an aggregated link bundle as one path and a single link as another path, the extended CSPF path computation operation may instruct a router to select and configure the aggregated link bundle as the primary path.

In some examples, router 16A may be configured to actively utilize one or more aggregated link bundles (not shown) in addition to aggregated link bundle 22A. In addition to advertising the link interface type, each of routers 16 may advertise a number of links and/or speed of the member links of the aggregated link bundle using an extended link state routing protocol message, in one example. For example, router 16A may advertise a link state routing protocol message including the number of links of aggregated link bundle 22A (e.g., ten) and/or the speed of each link of aggregated link bundle 22A (e.g., 1 gb). The information within the link state routing protocol messages associated with the number of links and/or speed of links of aggregated link bundle 22A may be stored in a TED.

When the various paths of router 16A include a plurality of aggregated link bundles, the extended CSPF may instruct router 16A to determine whether the plurality of aggregated link bundles satisfies a set of constraints including a number of links and/or a speed of links. For example, router 16A may perform a constraint matching condition such that if one of the plurality of aggregated link bundles has the highest number of links, router 16A may select the aggregated link bundle with the highest number of links for configuration as a preferred LSP. In another example, router 16A may perform a constraint matching condition such that if one of the plurality of aggregated link bundles has the highest speed of links, router 16A may select the aggregated link bundle with the highest speed of links for configuration as a preferred LSP. For example, router 16A may consult the TED and determine the number of links and/or speed of links for each of the aggregated link bundles that were advertised by the link state routing messages. Router 16A may determine that aggregated link bundle 22A is comprised of ten 1 gb Ethernet links and the other aggregated link bundle (not shown) is comprised of eight 1 gb Ethernet links. In this example, the set of constraints may include an aggregated link bundle with a higher number of links (and/or speed of links) configured to be more favorable than an aggregated link bundle with a lower number of links. By applying the extended CSPF path computation operation to the path information and the set of constraints, aggregated link bundle 22A may be selected for configuration as the preferred LSP. In this way, the selected primary path for the LSP may have the most links, which may reduce the occurrence of global repair should one or more links of aggregated link bundle 22A fail. In some examples, if more than one of the plurality of aggregated link bundles have the highest number of links, the extended CSPF may instruct router 16A to apply a CSPF load-balancing rule (e.g., least fill, most fill, or random) to select one of the plurality of aggregated link bundles as the preferred LSP.

The extended CSPF path computation operation may provide techniques for a router to select and configure an aggregated link bundle as a preferred LSP when the router utilizes various paths including the aggregated link bundle and one or more single links. The extended CSPF path computation operation may also provide techniques for a router to configure an aggregated link bundle with a higher number of links as the preferred LSP when the router utilizes various paths including a plurality of aggregated link bundles. The extended CSPF path selection process may also provide techniques for the router to configure an aggregated link bundle based on a CSPF load-balancing rule if the router utilizes various paths including a plurality of aggregated link bundles with the highest number of links. By using an aggregated link bundle as the preferred LSP, an occurrence of a link failure reduces the need for a complete LSP tear down. That is, global repair is reduced in MPLS LSPs using the aggregated link bundle as the preferred LSP.

Figure 2:
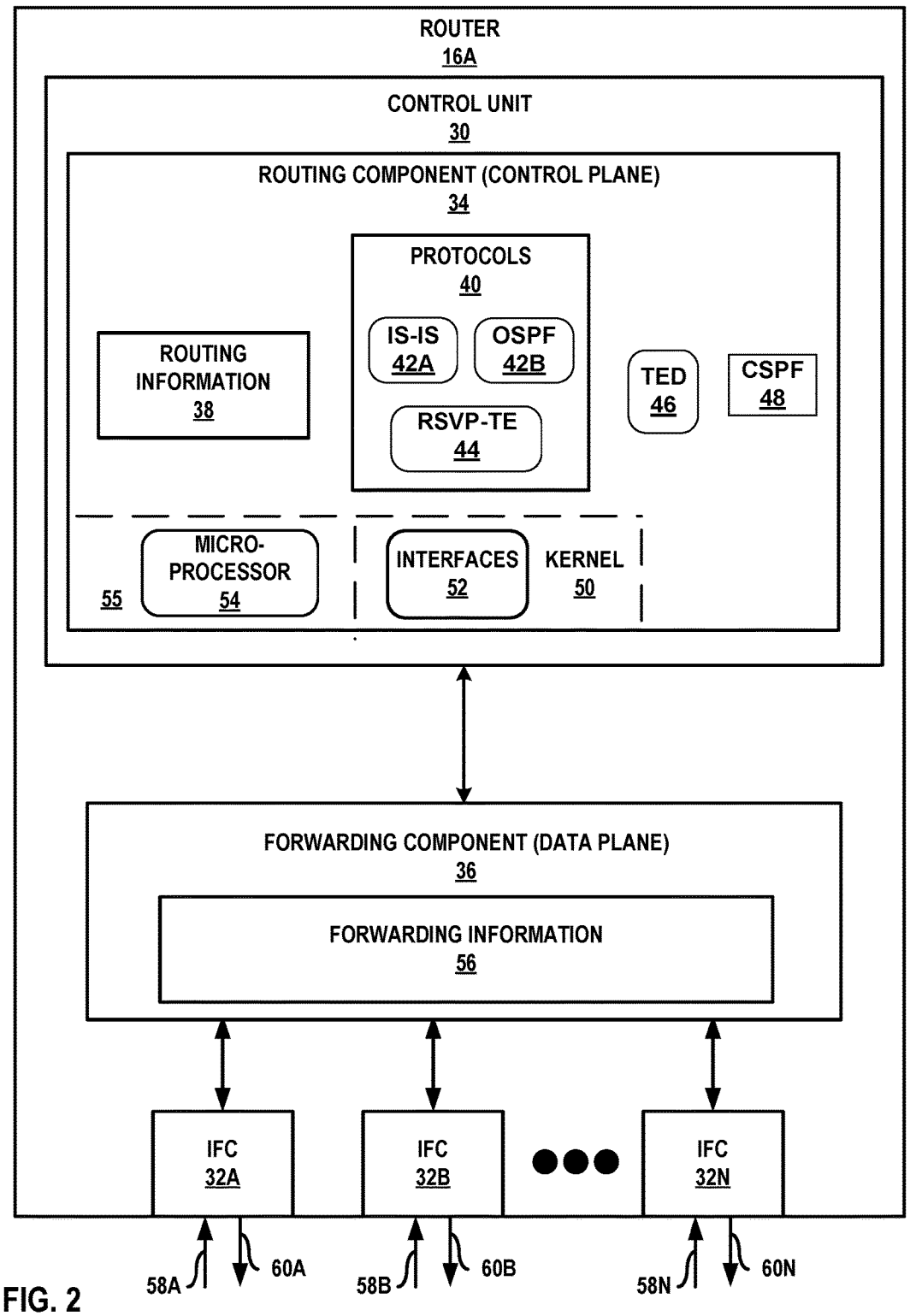
FIG. 2 is a block diagram illustrating an example of the router of FIG. 1 in more detail, in accordance with the techniques described herein.

FIG. 2 is a block diagram illustrating an example router, in accordance with techniques of this disclosure. Router 16A of FIG. 2 is described with respect to router 16A of FIG. 1, but may be described with respect to any of routers 16 of FIG. 1 in more detail. In this example, router 16A includes a control unit 30 that includes a routing component 34, and is coupled to a forwarding component 36. Forwarding component 36 is associated with one or more interface cards (IFCs) 32A-32N (collectively, "IFCs 32") that receive packets via inbound links 58A-58N (collectively, "inbound links 58") and send packets via outbound links 60A-60N (collectively, "outbound links 60"). IFCs 32 are typically coupled to links 58, 60 via a number of interface ports (not shown). Inbound links 58 and outbound links 60 may represent physical interfaces, logical interfaces, or some combination thereof.

Routing component 34 includes kernel 50, which provides a run-time operating environment for user-level processes. Kernel 50 may represent, for example, a UNIX operating system derivative such as Linux or Berkeley Software Distribution (BSD). Kernel 50 offers libraries and drivers by which user-level processes may interact with the underlying system. Hardware environment 55 of routing component 34 includes microprocessor 54 that executes program instructions loaded into a main memory (not shown in FIG. 2) from a storage device (also not shown in FIG. 2) in order to execute the software stack, including both kernel 50 and processes executing on the operating environment provided by kernel 50. Microprocessor 54 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Routing component 34 primarily provides an operating environment for control plane protocols 40. Routing component 34 may also be referred to as "control plane" in that routing component 34 provides an operating environment in which control plane protocols 40 and other control plane operations may be performed. For example, one or more IGP routing protocols 42, such as Intermediate System to Intermediate System (IS-IS) routing protocol 42A, or the Open Shortest Path First (OSPF) routing protocol 42B, maintain routing information 38 to reflect the current topology of a network and other network entities to which router 16A is connected. As described above, IGPs 42 may send and receive a link state routing message including at least an interface type of a link couple to router 16A. In some examples, IGPs 42 may additionally, or alternatively, send and receive a number of links and/or a speed of the member links of an aggregate bundle of links.

For example, router 16A may use IGPs 42 to advertise a link state routing message including information that router 16A is coupled to a single link (e.g., link 18A) and an aggregate link bundle (e.g., link 22A). IGPs 42 update routing information 38 to accurately reflect the topology of the network and other entities. Protocols 40 executing within routing component 34 may also include one or more MPLS protocols, e.g., RSVP-TE 44, for establishing an LSP, which may be accumulated by IGPs 42. Router 16A may include other protocols not shown, such as other Label Distribution Protocols (LDPs) and/or routing protocols, to provide one example.

Constrained Shortest Path First (CSPF) module 48 implements an extended CSPF path computation operation, as described in FIG. 1. To illustrate, routing component 34 may initiate CSPF module 48, which may compute a path through network 14 based on information stored in traffic engineering database (TED) 46, where this path is provided to RSVP-TE 44 to send and receive messages to egress router 16C to reserve resources for the LSP.

CSPF module 48 may implement an extended CSPF path computation operation that performs a lookup operation on TED 46 to determine the link interface type, number of links and/or speed of links coupled to router 16A. Based on this information, CSPF process 48 is more likely to select an aggregated link bundle for configuration as a preferred LSP for router 16A.

In one example, CSPF module 48 may, based on the extended CSPF path computation operation, instruct routing engine 34 to determine whether the various paths coupled to router 16A satisfies a set of constraints that include at least an aggregated link bundle interface type configured to be more favorable than a single link interface type. Routing component 34 may communicate with TED 46 to determine the interface types of links coupled to router 16A. Routing component 34 may perform a constraint matching condition to determine whether TED 46 includes an aggregated link bundle interface type. In response to determining that an aggregated link bundle interface type is stored in TED 46, CSPF module 48 may form a strict-hop Explicit Route Object (ERO) for the aggregated link bundle. When the ERO is formed, the ERO is passed to RSVP-TE, where RSVP-TE may signal and establish the aggregate link bundle as a preferred LSP in the network. Router 16A may send PATH messages to egress router 16C to reserve resources for the preferred LSP selected by the extended CSPF path computation operation. Router 16A may receive RESV messages from egress router 16C and may configure a routing table with the aggregated link bundle as the preferred LSP to the destination.

In some examples, the various paths coupled to router 16A may be two or more aggregate link bundles. In this example, CSPF module 48 may, based on the extended CSPF path computation operation, instruct router 16A to determine whether the two or more aggregate link bundles satisfies a set of constraints that include at least an aggregated link bundle interface type with the highest number of links configured to be more favorable than an aggregated link bundle with a lower number of links. Routing component 34 may communicate with TED 46 to determine the number of links of each aggregate link bundle coupled to router 16A. Routing component 34 may perform a constraint matching condition to determine if one of the two or more aggregate link bundles includes the highest number of links. In response to determining that an aggregated link bundle includes the highest number of links, CSPF module 48 may form an ERO for the aggregated link bundle with the highest number of links and pass the ERO to RSVP-TE to signal and establish the aggregate link bundle with the higher number of links as a preferred LSP in the network. Router 16A may send PATH messages to, and receive RESV messages from, egress router 16C to reserve resources for the preferred LSP selected by the extended CSPF path computation operation. Router 16A may configure a routing table with the aggregated link bundle with the higher number of links as the preferred LSP to the destination.

In some examples, the two or more aggregate link bundles may have multiple aggregated link bundles with the highest number of member links. In this example, CSPF module 48 may, based on the extended CSPF path computation operation, instruct router 16A to determine whether one of the multiple aggregated link bundles satisfies a set of constraints including at least a plurality of aggregated link bundles with the highest number of links. In this example, CSPF module 48 may instruct routing component 34 to use a CSPF load-balancing rule to select one of the multiple aggregate link bundles to be configured as a preferred LSP.

After configuring the primary path, routing component 34 generates and programs forwarding component 36 with forwarding information 56 that associates network destinations with specific next hops and corresponding interfaces ports of IFCs 32 in accordance with routing information 38. For example, routing component 34 analyzes routing information 38 (based on the extended CSPF path computation operation described above) and generates forwarding information 56 in accordance with routing information 38. In general, when router 16A receives a data packet on an LSP of a given Ethernet segment via one of inbound links 58, forwarding component 36, for example, identifies an associated next hop for the data packet by traversing forwarding information 56 based on information (e.g., labeling information) within the packet. Forwarding component 36 forwards the data packet on one of outbound links 60 to the corresponding next hop in accordance with forwarding information 56 associated with the Ethernet segment.

For example, routing component 34 may generate the next hop to aggregate link bundle 22A when the various paths coupled to router 16A includes the aggregate link bundle and a single link. In some examples, routing component 34 may generate the next hop to an aggregate link bundle with a higher number of links when the various paths coupled to router 16A includes two or more aggregate link. In another example, routing component 34 may generate the next hop based on CSPF load-balancing techniques (e.g., least fill, most fill, or random) when two or more aggregate link bundles coupled to router 16A have the highest number of links. Routing component 34 may generate forwarding information 56 in the form of one or more tables, link lists, radix trees, databases, flat files, or any other data structures.

Forwarding component 36 represents hardware and logic functions that provide high-speed forwarding of network traffic. Forwarding component 36 typically includes a set of one or more forwarding chips programmed with forwarding information that maps network destinations with specific next hops and the corresponding output interface ports. In general, when router 16A receives a packet via one of inbound links 58, forwarding component 36 identifies an associated next hop for the data packet by traversing the programmed forwarding information based on information within the packet. Forwarding component 36 (either the ingress forwarding component or a different egress forwarding component) forwards the packet on one of outbound links 60 mapped to the corresponding next hop.

Figure 3:
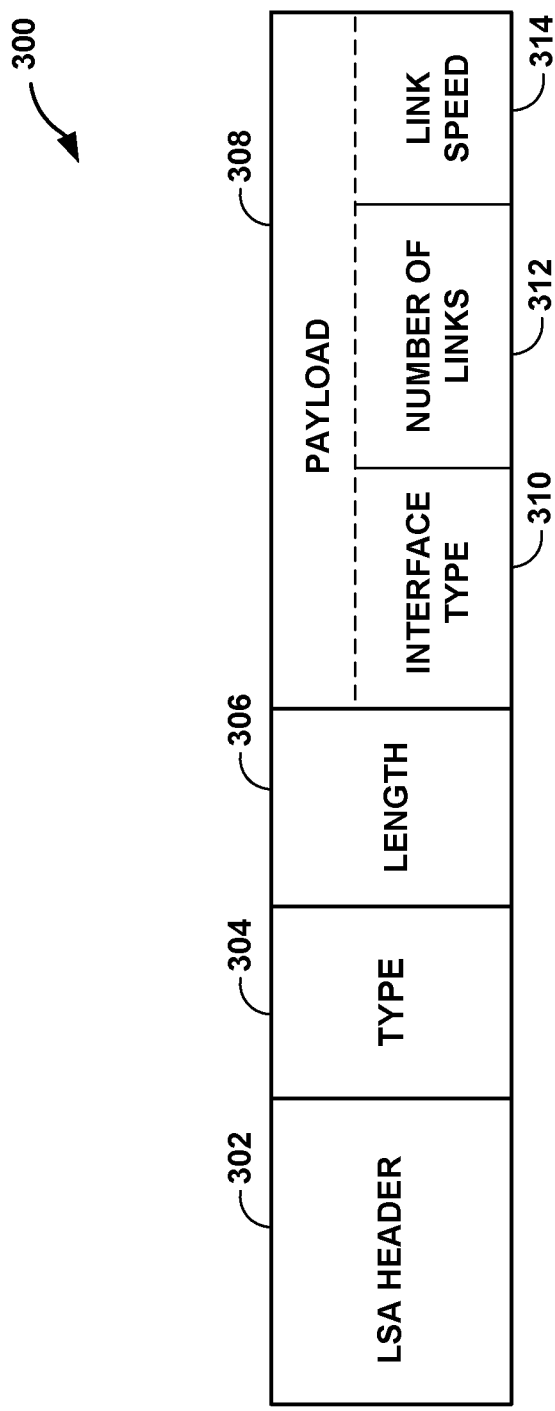
FIG. 3 is a block diagram illustrating an example packet, in accordance with the techniques described in this disclosure.

FIG. 3 is a block diagram illustrating an example format of a packet 300 for advertising interface type information, in accordance with the techniques described herein. Packet 300 may, for example, be an IS-IS or OSPF packet that has been extended to include additional fields. For illustration purposes, the following is described with respect to an OSPF packet, but may represent any link-state routing message using IGP. Further information regarding IS-IS and OSPF are found in Katz, D., "Traffic Engineering (TE) Extensions to OSPF Version 2," RFC 3830, September 2003, and Berger, L., "The OSPF Opaque LSA Option," RFC 5250, July 2008, the entire contents of each reference are incorporated by reference in their entirety herein.

Packet 300 includes an LSA header 302 that contains the time since the LSA was originated, a link state type, a link state ID, an advertising router ID, a link state sequence number, a link state checksum, and length.

In addition, packet 300 includes a type field 304 used by a router to announce the presence of the router and lists the links of the router to other routers in the network. For example, a type value of "1" indicates that the packet is used by the router to announce the presence and links of the router to other routers.

Packet 300 may include a length field 306 used to describe the length of payload field 308, e.g., in octets. Packet 300 may include a payload 308 including information describing a link. As one example, payload 308 may be constructed as a set of sub-type/length/values (sub-TLVs) that define a link type, a link ID, local interface IP address, remote interface IP address, traffic engineering metric, maximum bandwidth, maximum reservable bandwidth, unreserved bandwidth, and/or administrative group (not shown).

The payload 308 may further be extended to include one or more sub-TLVs of the interface type information described in this disclosure. For example, payload 308 may include an interface type field 310 to describe the interface type of links coupled to a router. For example, interface type 310 may describe a link as an aggregate link bundle and/or a single link. Payload 308 may include a number of links field 312 that includes a count of the member links of an aggregated link bundle. Additionally, or alternatively, payload 308 may also include a speed of links field 314. For example, the speed of links field 314 may include a network speed of a member link of an aggregated link bundle.

Figure 4:
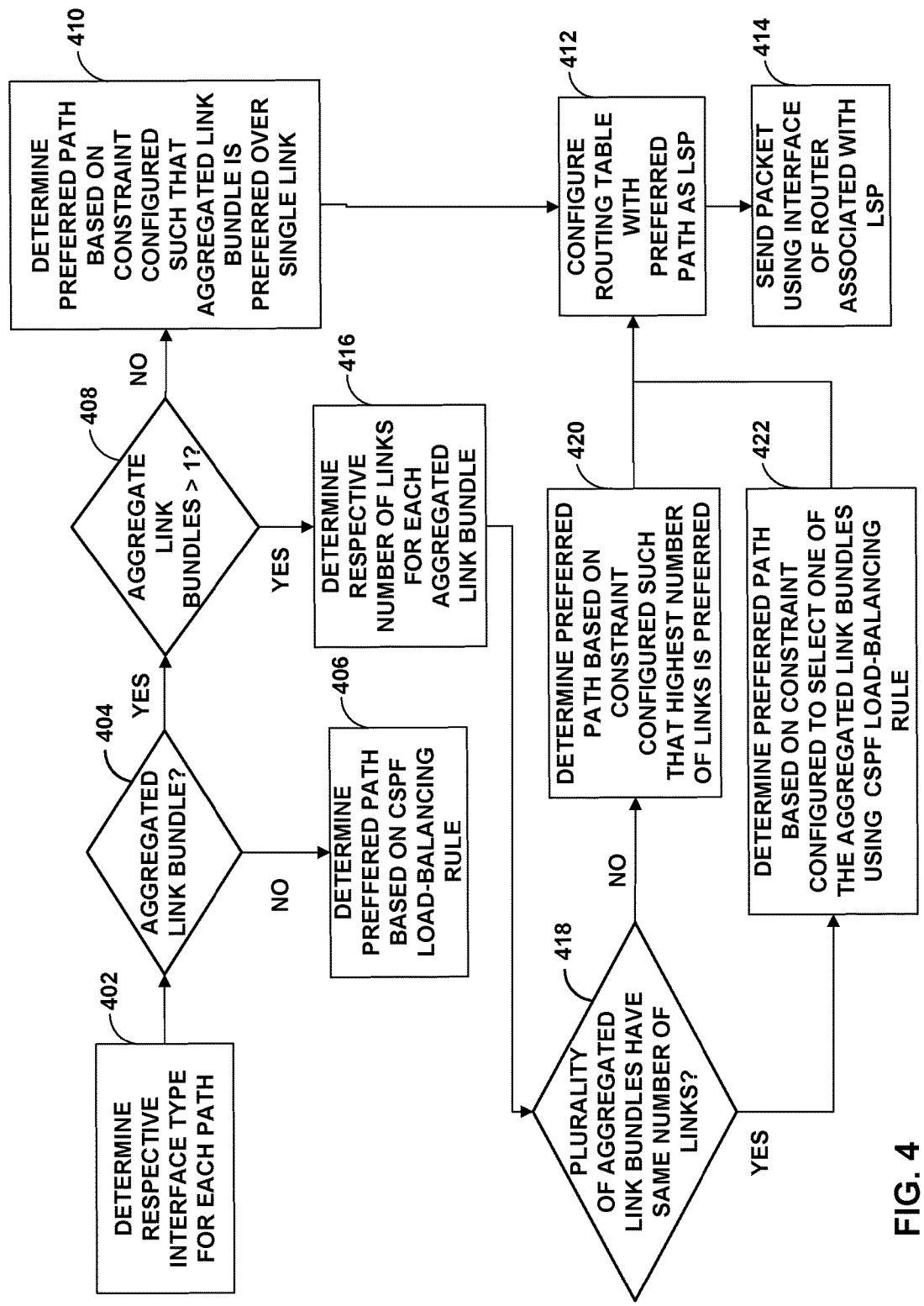
FIG. 4 is a flowchart illustrating example operation for reducing global repairs in MPLS LSPs by using an aggregated link bundle as a primary path, in accordance with the techniques of this disclosure.

FIG. 4 is a flowchart illustrating example operation of a network device, such as router 16A, in accordance with the techniques of this disclosure. FIG. 4 is described with respect to router 16A as shown in the example of FIGS. 1 and 2.

Router 16A may exchange link state routing messages to exchange information including interface type, number of links, and/or speed of links coupled to router 16A. Router 16A may use CSPF module 48 to apply an extended CSPF path computation operation to the information above to select a path based on a set of constraints to be configured as a preferred LSP. In one example, router 16A may determine a respective interface type for each path of a plurality of paths between the router and a destination (402). For example, router 16A may be configured to utilize a plurality of paths to forward traffic to a destination network device. CSPF module 48 may instruct router 16A to perform a lookup operation in TED 46 to determine the interface type information about the links coupled to router 16A.

Router 16A may determine whether one or more paths from the plurality of paths satisfies a set of constraints, which includes at least an aggregated link bundle interface type configured to be more favorable than the single link interface type (404). For example, CSPF module 48 may, based on the extended CSPF, determine whether an aggregated link bundle interface type is in TED 46.

In instances where there is no aggregated link bundle interface type in TED 46, router 16A may determine a preferred path based on the CSPF load-balancing rule for the single links (406). In instances where there is an aggregated link bundle interface type in TED 46 (408), CSPF module 48 of router 16A may determine whether the plurality of paths includes two or more paths that include the respective interface type for the aggregated link bundle (408). If only path includes the interface type for the aggregated link bundle, CSPF module 48 may instruct router 16A to determine a preferred path based on whether one of the plurality of paths satisfied the constraint configured such that an aggregated link bundle interface type is preferred over a single link interface type (410). For example, if at least an aggregated link bundle interface type and a single link interface type is in TED 46, CSPF module 48 may instruct router 16A to select the aggregated link bundle to be constructed as the preferred path.

Router 16A may configure a routing table of the router with the preferred path as an LSP to the destination (412). As noted above, router 16A may determine that the plurality of paths coupled to router 16A includes at least an aggregated link bundle and a single link. As a result of the extended CSPF path computation operation, CSPF module 48 may generate an ERO to establish the next-hop as the aggregated link bundle. In turn, router 16A may reserve resources by passing the ERO to RSVP-TE to signal and establish the aggregate link bundle as a preferred LSP in the network. After receiving the reservation messages from an egress router in the network to reserve resources for the preferred LSP, router 16A may configure a routing table with the aggregated link bundle as the preferred LSP.

After configuring the routing table with the aggregated link bundle, router 16A may send a packet using an interface associated with the LSP (414). By configuring an aggregated link bundle as a preferred LSP, router 16A may avoid implementing global repair to reconstruct the LSP to the destination upon a link failure of one or more links of the aggregated link bundle.

In some examples, router 16A may determine that the plurality of paths includes two or more paths that include the respective interface type for the aggregated link bundle (408). In this example, router 16A may also determine a respective number of links for each of the two or more aggregated link bundles (416). CSPF module 48 may instruct router 16A to perform a lookup operation of TED 46 to determine the number of links for each aggregated link bundle.

In one example, router 16A may determine whether the two or more aggregated link bundles each include the same number of links (418). If at least one of the two or more aggregated link bundles have a different number of links, router 16A may determine, based on the respective number of links for each of the two or more aggregated link bundles, whether one or more of the aggregated link bundles satisfies a set of constraints that are configured such that an aggregated link bundle with a highest number of links is preferred over an aggregated link bundle with a lower number of links (420). For example, when router 16A is coupled to a plurality of aggregated link bundles, CSPF module 48 may, in response to determining one of the aggregated link bundles includes the highest number of links, instruct router 16A to select the aggregated link bundle with the highest number of links to be constructed as the preferred path.

As a result of the extended CSPF path computation operation, CSPF module 48 may generate an ERO to establish the next-hop as the aggregated link bundle with the highest number of links. In turn, router 16A may reserve resources by passing the ERO to RSVP-TE to signal and establish the aggregate link bundle with the highest number of links as a preferred LSP in the network. After receiving the reservation messages from an egress router in the network to reserve resources for the preferred LSP, router 16A may configure a routing table with the aggregated link bundle with the highest number of links as the preferred LSP (412) such that router 16A may send traffic using the interface associated with the preferred LSP (414).

In some examples, router 16A may determine that each of the two or more aggregated link bundles have the same number of links (418). For example, router 16A may be coupled to two or more aggregated link bundles that each comprise ten 1 gb Ethernet links. Router 16A may determine from TED 46 that the paths for which router 16A is configured to forward traffic includes two or more aggregated link bundles, each with the highest number of links.

In this example, router 16A may determine, based on the respective number of links, whether one or more of the aggregated link bundles satisfies a set of constraints that includes at least the two or more aggregated link bundles having a same number of links. In this example, router 16A may determine a preferred path based on a set of constraints that are configured such that one of the two or more aggregated link bundles with the same number of links is selected using a CSPF load-balancing rule (422). For example, CSPF module 48 may instruct router 16A to select one of the aggregated link bundles by selecting one of the remaining paths at random, selecting the path with the largest minimum available bandwidth ratio, or selecting the path with the smallest minimum available bandwidth ratio. As a result of the extended CSPF path computation operation, CSPF module 48 may generate an ERO to establish the next-hop as the aggregated link bundle selected based on the CSPF load-balancing rule. In turn, router 16A may reserve resources by passing the ERO to RSVP-TE to signal and establish the aggregate link bundle as a preferred LSP in the network. After receiving the reservation messages from an egress router in the network to reserve resources for the preferred LSP, router 16A may configure a routing table with the aggregated link bundle selected by the CSPF load-balancing rule as the preferred LSP (412) such that router 16A may send traffic using the interface associated with the preferred LSP (414).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   determining, by a router and based on a link state routing message, a plurality of link interface types for the plurality of paths, wherein the plurality of link interface types includes a single link interface type that classifies a first path of the plurality of paths as a single link and an aggregated link bundle interface type that classifies a second path of the plurality of paths as an aggregated link bundle, wherein the router can reach a destination device via each of the plurality of paths;
   determining, by the router, that the single link and the aggregated link bundle satisfy a set of constraints, wherein the set of constraints are configured such that the aggregated link bundle is a preferred path over the single link;
   configuring, by the router, a routing table of the router with the aggregated link bundle as a preferred Label-Switched Path (LSP) to the destination; and
   sending, by the router and based on the routing table, one or more packets using the preferred LSP.

2. The method of claim 1, further comprising:
   determining, by the router, that one or more links of the aggregated link bundle failed; and
   in response to determining that the one or more links failed, refraining, by the router, from performing global repair to reconstruct the LSP to the destination when at least one of the links of the aggregated link bundle has not failed.

3. The method of claim 1, wherein the aggregated link bundle comprises a first aggregated link bundle, and wherein the plurality of paths comprises a third path as a second aggregated link bundle, further comprising:
   determining, by the router, a respective number of links for the first aggregated link bundle and the second aggregated link bundle;
   determining, by the router that the first aggregated link bundle and the second aggregated link bundle satisfy the set of constraints, wherein the set of constraints are configured such that the second aggregated link bundle with a higher number of links is preferred over the first aggregated link bundle with a lower number of links; and
   configuring, by the router, the routing table with the second aggregated link bundle as the preferred LSP to the destination.

4. The method of claim 1, wherein the aggregated link bundle comprises a first aggregated link bundle, and wherein the plurality of paths comprises a third path as a second aggregated link bundle, further comprising:
   determining, by the router, a respective number of links for the first aggregated link bundle and the second aggregated link bundle;
   determining, by the router that the first aggregated link bundle and the second aggregated link bundle have a same number of links and satisfy the set of constraints, wherein the set of constraints are configured such that a preferred aggregate link bundle is selected from the first aggregate link bundle and the second aggregate link bundle using a CSPF load-balancing rule; and
   configuring, by the router, the routing table with the second preferred aggregated link bundle as the preferred LSP to the destination.

5. The method of claim 1, wherein configuring the routing table of the router with the preferred aggregated link bundle as the preferred LSP to the destination comprises:
   applying, by the router, a Constrained Shortest Path First (CSPF) path computation operation to each path from the plurality of paths, wherein the CSPF path computation operation considers at least one of the plurality of link interface types, a number of links, or speed of links for each path from the plurality of paths.

6. The method of claim 1, further comprising:
   receiving, by the router, one or more Interior Gateway Protocol (IGP) packets including a respective interface type for a corresponding path of the plurality of paths.

7. The method of claim 6, wherein the IGP packet further comprises a number of links for the corresponding path of the plurality of paths.

8. The method of claim 6, wherein the IGP packet further comprises a speed of links for the corresponding path of the plurality of paths.

9. A network device comprising:
   a plurality of network interfaces, each of the network interfaces coupled to a different one of a plurality of paths for reaching a destination network device; and
   one or more hardware-based processors, implemented using discrete logic circuitry, configured to:
      determine a plurality of interface types for the plurality of paths, wherein the plurality of link interface types includes a single link interface type that classifies a first path of the plurality paths as a single link and an aggregate link bundle interface type that classifies a second path of the plurality of paths as an aggregated link bundle;
      determine that the single link and the aggregated link bundle satisfy a set of constraints, wherein the set of constraints are configured such that the aggregated link bundle is a preferred path over the single link;
      configure a routing table of the router with the aggregated link bundle as a preferred Label-Switched Path (LSP) to the destination; and
      send, based on the routing table, one or more packets using the preferred LSP.

10. The network device of claim 9, wherein the one or more processors are further configured to:
   determine that one or more links of the aggregated link bundle failed; and
   in response to determining that the one or more links failed, refrain from performing global repair to reconstruct the LSP to the destination when at least one of the links of the aggregated link bundle has not failed.

11. The network device of claim 9, wherein the aggregated link bundle comprises a first aggregated link bundle, and wherein the plurality of paths comprises a third path as a second aggregated link bundle, wherein the one or more processors are further configured to:

determine a respective number of links for the first aggregated link bundle and the second aggregated link bundle;

determine that the first aggregated link bundle and the second aggregated link bundle satisfy the set of constraints, wherein the set of constraints are configured such that the second aggregated link bundle with a higher number of links is preferred over the first aggregated link bundle with a lower number of links; and configure the routing table with the second aggregated link bundle as the preferred LSP to the destination.

12. The network device of claim 9, wherein the aggregated link bundle comprises a first aggregated link bundle, and wherein the plurality of paths comprises a third path as a second aggregated link bundle, wherein the one or more processors are further configured to:

determine a respective number of links for the first aggregated link bundle and the second aggregated link bundle;

determine that the first aggregated link bundle and the second aggregated link bundle have a same number of links and satisfy the set of constraints, wherein the set of constraints are configured such that a preferred aggregate link bundle is selected from the first aggregate link bundle and the second aggregate link bundle using a CSPF load-balancing rule; and configure the routing table with the preferred aggregate link bundle as the preferred LSP to the destination.

13. The network device of claim 9, wherein, to configure the routing table of the router with the preferred aggregate link bundle as the preferred LSP to the destination, the one or more processors are further configured to:

apply a Constrained Shortest Path First (CSPF) path computation operation to each path from the plurality of paths, wherein the CSPF path computation operation considers at least one of the plurality of interface types, a number of links, or speed of links for each path from the plurality of paths.

14. The network device of claim 9, wherein the one or more processors are further configured to:

receive one or more Interior Gateway Protocol (IGP) packets including a respective interface type for a corresponding path of the plurality of paths.

15. The network device of claim 9, wherein the IGP packet further comprises a number of links for the corresponding path of the plurality of paths.

16. The method of claim 6, wherein the IGP packet further comprises a speed of links for the corresponding path of the plurality of paths.

17. A non-transitory computer-readable storage medium having stored thereon instructions that, when executed, cause one or more processors to:

determine a plurality of interface types for a plurality of paths, wherein the plurality of link interface types includes a single link interface type that classifies a first path of the plurality paths as a single link and an aggregate link bundle interface type that classifies a second path of the plurality of paths as an aggregated link bundle, wherein a router can reach a destination device via each of the plurality of paths;

determine that the single link and the aggregated link bundle satisfy a set of constraints, wherein the set of constraints are configured such that the aggregated link bundle is a preferred path over the single link;

determine, based on whether one or more paths of the plurality of paths satisfies the set of constraints, a preferred path;

configure a routing table of the router with the aggregated link bundle as a preferred Label-Switched Path (LSP) to the destination; and send, based on the routing table, one or more packets using the preferred LSP.

18. The non-transitory computer-readable storage medium of claim 17, wherein the aggregated link bundle comprises a first aggregated link bundle, and wherein the plurality of paths comprises a third path as a second aggregated link bundle, further comprising instructions that cause one or more processors to:

determine a respective number of links for the first aggregated link bundle and the second aggregated link bundle;

determine that the first aggregated link bundle and the second aggregated link bundle satisfy the set of constraints, wherein the set of constraints are configured such that the second aggregated link bundle with a higher number of links is preferred over the first aggregated link bundle with a lower number of links; and configure the routing table with the second aggregated link bundle as the preferred LSP to the destination.

19. The non-transitory computer-readable storage medium of claim 17, wherein the aggregated link bundle comprises a first aggregated link bundle, and wherein the plurality of paths comprises a third path as a second aggregated link bundle, further comprising instructions that cause one or more processors to:

determine a respective number of links for the first aggregated link bundle and the second aggregated link bundle;

determine that the first aggregated link bundle and the second aggregated link bundle have a same number of links and satisfy the set of constraints, wherein the set of constraints are configured such that a preferred aggregate link bundle is selected from the first aggregate link bundle and the second aggregate link bundle using a CSPF load-balancing rule; and configure the routing table with the preferred aggregate link bundle as the preferred LSP to the destination.

20. The non-transitory computer-readable storage medium of claim 17, further comprising instructions that cause one or more processors to:

apply a Constrained Shortest Path First (CSPF) path computation operation to each path from the plurality of paths, wherein the CSPF path computation operation considers at least one of the plurality of interface types, a number of links, or speed of links for each path from the plurality of paths.

* * * * *